Sept. 1, 1970　　　　H. KLIE ET AL　　　3,526,764
RETRACTABLE MOTOR VEHICLE HEADLIGHT ARRANGEMENT
Filed March 8, 1968　　　　　　　　　　　　2 Sheets-Sheet 1

Inventor:
HEINRICH KLIE, THEODOR BAUER

BY Craig & Antonelli
ATTORNEYS

Inventor:
HEINRICH KLIE, THEODOR BAUER

BY Craig & Antonelli
ATTORNEYS

United States Patent Office 3,526,764
Patented Sept. 1, 1970

3,526,764
RETRACTABLE MOTOR VEHICLE HEADLIGHT ARRANGEMENT
Heinrich Klie, Asperg, Wurttemberg, and Theodor Bauer, Leinfelden, Wurttemberg, Germany, assignors to Firma Dr.-Ing., h.c.F. Porsche KG, Zuffenhausen, Germany
Filed Mar. 8, 1968, Ser. No. 711,670
Claims priority, application Germany, Mar. 10, 1967, 1,630,909
Int. Cl. B60q 1/06
U.S. Cl. 240—7.1                                                    13 Claims

ABSTRACT OF THE DISCLOSURE

The headlight frame is movable between a lighting position and a retracted position into the vehicle body, with the light beams from the headlight being directed generally in the forward direction with respect to the driving direction for both positions of the headlight frame. The headlight frame is driven by an electric motor about an axis extending generally in the driving direction and locked in its positions by means of a locking bolt that is solenoid actuated and also controls the motor operation as well as the current to the headlights.

BACKGROUND OF THE INVENTION

Retractable headlights are known that pivot about an axis extending generally perpendicular to the driving direction of the vehicle. Therefore, the headlights are only usable in the extended position.

SUMMARY OF THE INVENTION

It is an object of the present invention to provide the headlight frame with a retracted position in the vehicle body where the headlights may be used also for daylight signaling. This is accomplished by mounting the headlight frame for pivoting movement about an axis extending generally in the driving direction of the vehicle so that both in the lighting position and the retracted position, the headlights will be capable of emitting light beams in generally the forward direction. The vehicle body is provided with wall portions having apertures adjacent the headlight in its retracted position for allowing restricted passage of the light beams from the headlight in its retracted position. When the headlghts do not extend in exactly the desired direction when in the retracted position, additional means, such as a prism profiled lens may be provided to change the direction of the light beams to the desired direction.

The pivotal movement of the headlight frame is effected by an electric motor being controlled by the position of a locking device for the corresponding headlight, so that operation of the motor is prevented in the locked position of the headlight frame. Electrical contacts for controlling the current to the headlights are operated by means of the locking device position, so that current is provided for the headlight only in its terminal positions, that is, current will not be supplied to the headlight during movement of the headlight frame or in its intermediate positions. The locking device includes a locking bolt extendable and retractable by a solenoid into a cooperating socket, with one member of the locking device being mounted on the vehicle body and the other member being mounted on the headlight frame. Contact portions of the electrical contacts are carried by the locking bolt for actuation therewith. In addition, a manually operatable device is provided for retracting the locking bolt independently of the solenoid.

BRIEF DESCRIPTION OF THE DRAWING

Further objects, features and advantages of the present invention will become more clear from the following detailed description of the drawing, wherein.

DETAILED DESCRIPTION OF THE DRAWING

Figures 1, 2:
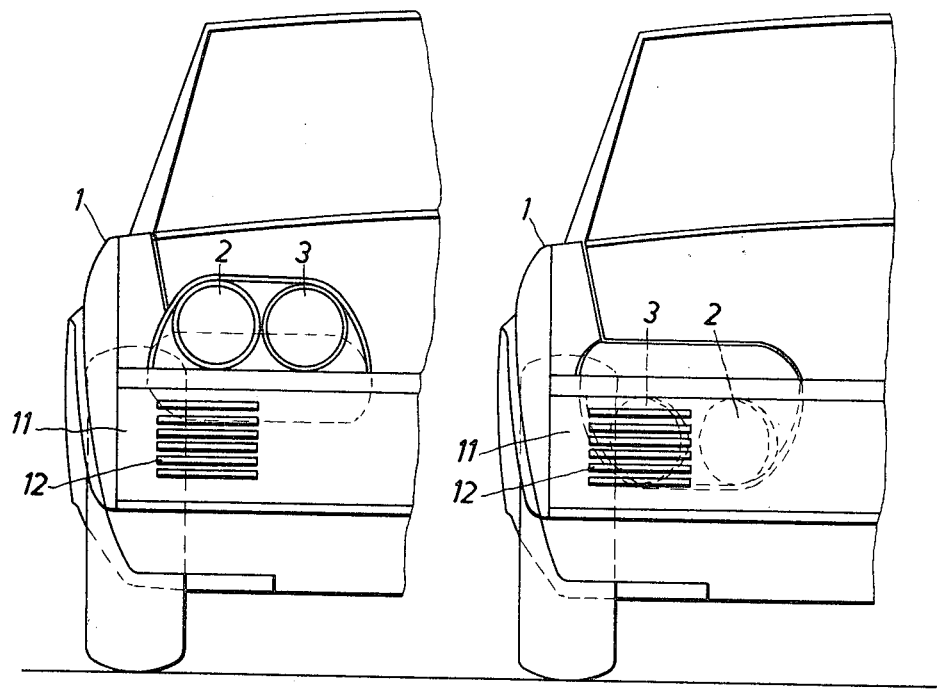
FIG. 1 is a partial front view of the motor vehicle with the headlight arrangement of the present invention being in the lighting position.
FIG. 2 is a partial front view of the motor vehicle according to FIG. 1, with the headlight frame in its retracted position.

As shown in FIG. 1, the motor vehicle, preferably a sports car, has a streamlined body provided with double headlights 2, 3 on each side of the vehicle, which headlights conform to the streamlined body. The headlights are mounted in headlight frames so that they may be retracted from the lighting position of FIG. 1 to the retracted position of FIG. 2 into the vehicle body for further enhancement of the streamlining.

Figure 4:
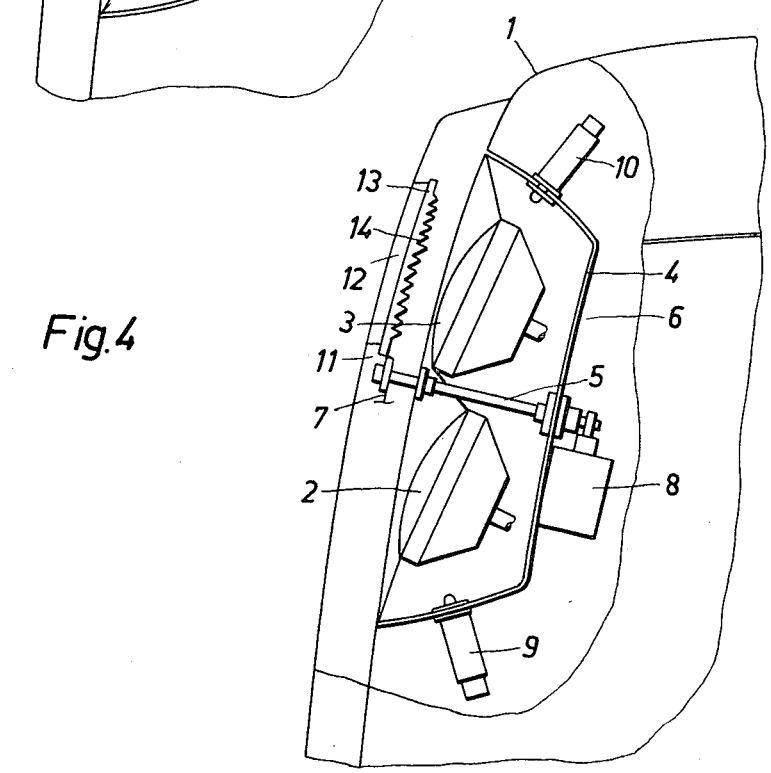
FIG. 4 is a partial top view of the headlight arrangement as shown in FIG. 2, with portions removed.

The headlights 2, 3 are mounted in a headlight housing 4 that is secured for rotation with a shaft 5, which shaft 5 is rotatably supported at its opposite ends in the walls 6 and 7 of the motor vehicle body surrounding the headlight housing 4. The shaft 5 extends generally in the driving direction and is driven along with the headlight housing 4 about its axis by means of an electric motor drivingly connected therewith. Locking devices 9, 10 are provided for locking the headlight housing in its lighting position and in its retracted position. The headlight 2 is employed in its retracted position as a light horn or visual warning signal. For this purpose, the outer wall 11 of the body, which forms the bumper, is provided with a plurality of slots or apertures 12 through which the light beams travel from the headlight to the outside. A lens having a prism profiled surface 14 is mounted between the slots 12 and the headlight 2 for directing the light beams in the direction of travel, that is for bending them toward the direction of travel as more clearly apparent from FIG. 4.

Figure 5:
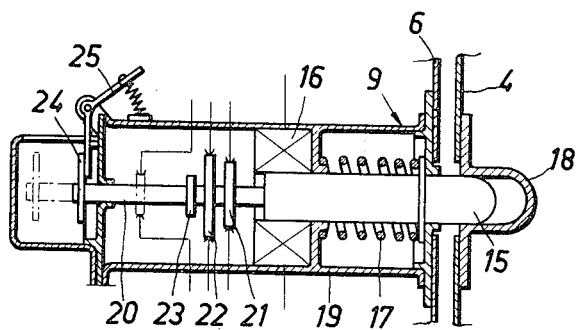
FIG. 5 is a partial cross sectional view of the locking device.
Figure 3:
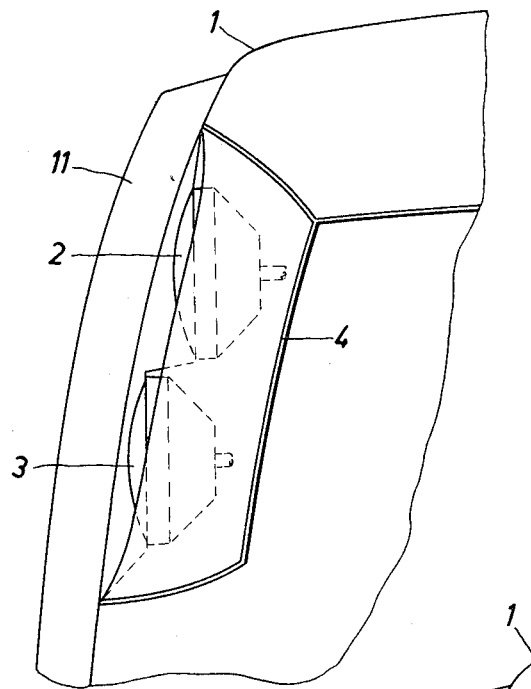
FIG. 3 is a partial top view of the headlight arrangement as shown in FIG. 1.

As shown in FIG. 5, the locking device 9 includes a metal locking bolt 15, which is movable axially be means of a solenoid 16. The locking bolt 15 is normally biased into its locking position by means of a coil spring 17. In the locking position, the locking bolt engages within a cooperating sleeve or socket, which preferably consists of a synthetic plastic and is fastened to the headlight housing 4. The locking bolt 15 together with the solenoid 16 is mounted within a housing 18, which is fastened to the wall portion 6 of the vehicle body. The locking bolt 15 is provided with an integral rod 20 of a nonelectrically conductive material, which rod 20 is provided with a plurality of electrical contacts 21, 22 and 23, for example, for the distant light, dim light, and for the drive motor 8 respectively. Contacts 21 and 22, for the distant and dim light beams of the headlight, are closed in the locked position of the housing 4, whereas the contact 23 for the drive motor is only closed when the locking device is released, that is when the locking bolt 15 is retracted from the sleeve 18.

In order to retract the headlight housing 4, the solenoid 16 is electrically actuated to retract the locking bolt 15, that is move the locking bolt 15 to the left as viewed in FIG. 5 of the drawing. At the same time, contacts 21 and 22 are opened so that the headlights do not receive any electric current. As soon as the locking bolt 15 has been retracted completely out of the sleeve 18, the contact 23 for driving the motor is closed and the motor is energized to rotate the housing 4 to its subsequent position. When the housing arrives at its next position, the bolt 15 automatically engages into the cooperating sleeve 18 and the contact 23 for the driving motor 8 is opened to de-energize the motor, and the contacts 21, 22 are closed for providing current to the headlight for elimination.

An abutment plate 24 is provided integral with the shaft 20 at its end opposite from the bolt 15. A pivotally mounted spring urged lever 25 is provided on the housing 19 for manual rotation in the clockwise direction, as viewed in FIG. 5, to move the abutment plate 24, as well as the rod 20, in the left hand direction to retract the bolt 15 manually.

It is contemplated that in its broad aspects, the present headlight arrangement invention may be employed with either a single headlight or a double headlight, on one side of the motor vehicle.

FIG. 5 is a somewhat schematic illustration of one embodiment of the locking device and other substantially different embodiments are contemplated within the broader aspects of a locking device for a movable frame. Although two locking bolts are illustrated for each movable headlight frame, it is contemplated that a single locking device may be employed for each movable frame. Also, only one electrical contact may be provided for the purpose of signaling. The solenoid may be directly or indirectly controlled by the main headlight switch. The sequential operation of the solenoid, electric motor and current supply for the headlights may be accomplished automatically in any combination.

Although one preferred embodiment of the present invention has been described in detail for purposes of illustration, further modifications, variations and embodiments of the present invention are contemplated within the spirit and scope of the following claims.

We claim:
1. A motor vehicle headlight arrangement with at least one headlight on one side being mounted on a headlight frame selectively movable from a lighting position to a retracted position in the vehicle body, the improvement comprising: means mounting the headlight frame with the headlight directed generally forwardly with respect to the driving direction in the lighting position and in the retracted position, wherein the vehicle body includes wall means immediately forward of the headlight in the retracted position and said wall means having aperture means for allowing only a restricted passage therethrough of the light beams from the headlight in the forward position and relatively unrestricted passage of the headlight light beams forwardly in the lighting position.

2. A motor vehicle headlight arrangement with at least one headlight on one side being mounted on a headlight frame selectively movable from a lighting position to a retracted position in the vehicle body, the improvement comprising: means mounting the headlight frame with the headlight directed generally forwardly with respect to the driving direction in the lighting position and in the retracted position, wherein said mounting means pivotably supports said headlight frame for pivoting movement about an axis generally extending parallel to the driving direction.

3. The headlight arrangement according to claim 2, wherein the vehicle body includes wall means having aperture means for the passage of light beams from the headlight in its retracted position in the vehicle body.

4. The headlight arrangement according to claim 3, including bolt means locking said headlight frame in at least one of its said positions under control from the operators position within the vehicle body and separate manual means for retracting said locking bolt means to unlock said headlight frame.

5. The headlight arrangement according to claim 3, including additional means directing the light beams from said headlight in its retracted position in a desired direction.

6. The headlight arrangement according to claim 5, wherein said additional means is a prism profiled lens.

7. The headlight arrangement according to claim 2, including an electric motor drivingly connected to said headlight frame to move said headlight frame between its said positions.

8. The headlight arrangement according to claim 7, including bolt means locking said headlight frame in at least one of its said positions under control from the operators position within the vehicle body and separate manual means for retracting and locking bolt means to unlock said headlight frame.

9. The headlight arrangement according to claim 7, including means locking said headlight frame in at least one of its said positions, and means controlling the driving of said electric motor dependent upon the position of said locking means.

10. The headlight arrangement according to claim 9, wherein said locking means includes a socket and a cooperating bolt engageable in and retractable from said socket, and a solenoid drivingly connected to said bolt; said electrical contacts having contact portions mounted on said bolt.

11. The headlight arrangement according to claim 9, wherein said controlling means includes electrical contacts in series circuit with said headlight, and opened and closed by the position of said locking means.

12. The headlight arrangement according to claim 11, wherein said locking means includes a socket and a cooperating bolt engageable in and retractable from said socket, and a solenoid drivingly connected to said bolt; said electrical contacts having contact portions mounted on said bolt.

13. The headlight arrangement according to claim 2, including bolt means locking said headlight frame in at least one of its said positions under control from the operator's position within the vehicle body and separate manual means for retracting said locking bolt means to unlock said headlight frame.

References Cited

UNITED STATES PATENTS 2,066,981   1/1937   Koca.
3,284,623   11/1966  Neal _____ 240—7.1

NORTON ANSHER, Primary Examiner

K. C. HUTCHISON, Assistant Examiner

U.S. Cl. X.R.

240—41.6